US008376316B2

(12) United States Patent
Gustafson et al.

(10) Patent No.: US 8,376,316 B2
(45) Date of Patent: Feb. 19, 2013

(54) INSTITUTIONAL HANDLE ASSEMBLY

(75) Inventors: John R. Gustafson, Jamestown, NY (US); Geoffrey D. Thorp, Jamestown, NY (US); Michael F. Migliore, Frewsburg, NY (US)

(73) Assignee: Zurn Industries, LLC, Erie, PA (US)

( * ) Notice: Subject to any disclaimer, the term of this patent is extended or adjusted under 35 U.S.C. 154(b) by 1262 days.

(21) Appl. No.: 12/113,478

(22) Filed: May 1, 2008

(65) Prior Publication Data

US 2008/0271287 A1 Nov. 6, 2008

Related U.S. Application Data

(60) Provisional application No. 60/927,121, filed on May 1, 2007.

(51) Int. Cl.
*F16K 51/00* (2006.01)
(52) U.S. Cl. .............. 251/285; 251/42; 251/46; 251/47; 251/51; 251/52
(58) Field of Classification Search .................... 251/35, 251/39, 42, 46, 47, 51, 52, 54, 284, 285
See application file for complete search history.

(56) References Cited

U.S. PATENT DOCUMENTS

| | | | | |
|---|---|---|---|---|
| 2,710,736 A | * | 6/1955 | Miller | 251/285 |
| 4,570,899 A | * | 2/1986 | Kingham | 251/51 |
| 4,784,368 A | * | 11/1988 | Koch et al. | 251/51 |
| 4,899,778 A | | 2/1990 | Laube | |
| 4,991,819 A | | 2/1991 | Laube | |
| 5,427,351 A | * | 6/1995 | Korfgen et al. | 251/39 |
| D517,165 S | | 3/2006 | Dmitruk et al. | |
| 7,134,451 B1 | | 11/2006 | Malapanes | |

OTHER PUBLICATIONS

Catalogue, Technical Data, "Drinking Fountain", Chicago Faucets—a Geberit Company, Des Plaines, IL, Fitting No. 748, Aug. 30, 2006 (1 page).
Catalogue, "Bubblers", Chicago Faucets—Commercial Plumbing, 748-CP, Copyright © 2006, www.chicago faucets.com (1 page).
Zurn AquaSpec®, Single Basin Metering Z-86100, Zurn Industries, Inc., Commercial Brass Operations, www.zurn.com, Nov. 20, 1997, C.N. No. 76779, Dwg. No. 60516 (1 page).
Zurn AquaSpec®, Single Basin Metering Z-86100 Parts List, Zurn Industries, Inc., Commercial Brass Operations, www.zurn.com, Nov. 20, 1997, C.N. No. 76780, Form No. CF59 (1 page).
Zurn AquaSpec®, Single Foot Pedal Valve Z-85100, Zurn Industries, Inc., Commercial Brass Operations, www.zurn.com, Nov. 20, 1997, C.N. No. 76782, Dwg. No. 60534 (1 page).
Zurn AquaSpec®, Single Foot Pedal Valve Z-85100 Parts List, Zurn Industries, Inc., Commercial Brass Operations, www.zurn.com, Aug. 22, 1997, C.N. No. 78364, Form No. CF115 (1 page).

(Continued)

*Primary Examiner* — Steven J Ganey
(74) *Attorney, Agent, or Firm* — The Webb Law Firm

(57) ABSTRACT

A vandal resistant adjustable metered handle assembly for a faucet is disclosed. The handle assembly includes a body having a base adapted for attachment to a sink and a sidewall extending in an upward direction with respect to the base. The base is attached to a push button handle via a stem. A spring is associated with the body and the push button handle for metering an amount of water emitting from the faucet and a sleeve is positioned between the body and the push button handle. The sleeve cooperates with the sidewall of the body to adjust the shut-off time of the metered handle assembly. The sleeve may be color-coded to indicate water temperature. The handle assembly can be made vandal resistant by adhesively securing various components together and providing an unconventional attachment member for securing the handle assembly to a sink.

11 Claims, 6 Drawing Sheets

OTHER PUBLICATIONS

Chicago Faucets, Deck Mounted Metering Faucet, 333-SLOE12COLDCP, a Geberit Company, Des Plaines, IL, Jan. 14, 2002, (3 pages).

T&S Brass and Bronze Works, Inc., Wash Sink Metering Faucet w/ 1/2" NPT Female Inlet & Adjustable Flow, Model No. B-0800, www.tsbrass.com, Jan. 8, 2008 (2 pages).

Delta Commercial, TECK®, Mixing Metering Handwash Faucet, www.specselectonline.com, printed Jun. 27, 2008 (2 pages).

Zurn AquaSpec® Faucets, Double Foot Pedal Valve, Model Z85500, Zurn Industries, Inc., Commercial Brass Operation, Aug. 12, 2005, Form CF148, C.N. 103089 (2 pages).

* cited by examiner

INSTITUTIONAL HANDLE ASSEMBLY

CROSS REFERENCE TO RELATED APPLICATION

The present application claims priority to provisional application No. 60/927,121 filed on May 1, 2007, the entire disclosure of which is incorporated herein in its entirety.

BACKGROUND OF THE INVENTION

1. Field of the Invention

The present invention is related, in general, to a metered institutional handle assembly and, more particularly, to an adjustable, vandal resistant metered handle assembly for use in correctional facilities.

2. Description of Related Art

Metered faucet handles which automatically shut off after a predetermined amount of time are commonly used in public restrooms to control the amount of water used at a given time. These handles also prevent one from inadvertently leaving the water running after completion of hand washing and exiting the washing area. Currently used metered handles typically include a circular push button member, usually having a temperature indicator engraved on a top surface thereof, which includes an internal shut-off spring and a standard shaped hex-nut attachment feature. These handles are preset during manufacture to have a certain shut-off time. Once installed, adjustment of the shut-off time is difficult as it requires disassembly of the handle assembly from the sink. Also, the use of standard shaped components leaves these metered faucets vulnerable to destruction by vandals.

SUMMARY OF THE INVENTION

There is a need in the art for a metered handle assembly wherein the shut-off timing may be easily adjusted without the need for disassembling the handle. There is further need in the art for a metered handle assembly that is difficult to vandalize and/or destroy. There is still another need in the art for a metered handle assembly including a water temperature-indicating member that is easily and inexpensively attached to the assembly.

According to a first aspect, the present invention is directed to an adjustable metered handle assembly for a faucet wherein the handle assembly includes a body having a base adapted for attachment to a sink and a sidewall extending in an upward direction with respect to the base. The base includes an aperture extending therethrough for attachment to a push button handle via a stem having a first portion extending through the aperture in the body base and a second portion attached to an inner surface of the push button handle. A spring is associated with the body and the push button handle for metering an amount of water emitting from the faucet and a sleeve is positioned between the body and the push button handle. The sleeve includes an inwardly extending connecting portion for cooperating with the sidewall of the body for adjusting the height between the push button handle and the body, resulting in an adjustment of the shut-off time of the metered handle assembly. The sleeve may be color-coded to indicate water temperature.

According to a second aspect, the present invention is directed to a vandal resistant metered handle assembly for a faucet. The handle assembly includes a body including a base adapted for attachment to a sink and a sidewall extending in an upward direction with respect to the base. The base includes an aperture extending therethrough and a stem having a first portion is positioned within this aperture. The stem includes a second portion which is associated with an inner surface of a push button handle. A spring is associated with the body and the push button handle for metering an amount of water emitting from the faucet and a sleeve is positioned between the body and the push button handle. The sleeve includes an inwardly extending connecting portion for cooperating with the sidewall of the body. The base also includes an exposed shoulder for attachment of the handle assembly to the sink. This exposed shoulder has a vandal resistant rounded outer surface which requires a special tool, not commonly available, to remove it from the sink.

According to a third aspect, the invention is directed to a method of adjusting the timing of a metered handle assembly comprising a body including a base adapted for attachment to a sink and a sidewall extending in an upward direction with respect to the base and including an aperture extending therethrough. The method further includes providing a stem having a first portion and a second portion and extending the first portion of the stem through the aperture in the base of the body, providing a push button handle having an outer and inner surface, attaching the inner surface of the push button to the second portion of the stem, associating a spring with the body and the push button handle for metering an amount of water emitting from the faucet, and positioning a sleeve between the body and the push button handle wherein the sleeve includes an inwardly extending connecting portion adapted for moving along a predetermined height of the sidewall, and adjusting the sleeve with respect to the sidewall to adjust a shut-off time of the metered handle assembly and control a predetermined amount of water released from the faucet.

Further details and advantages will be understood from the following description of the preferred embodiments, taken with the accompanying drawings, wherein like reference numerals represent like elements throughout.

DETAILED DESCRIPTION OF THE INVENTION

Figure 1:
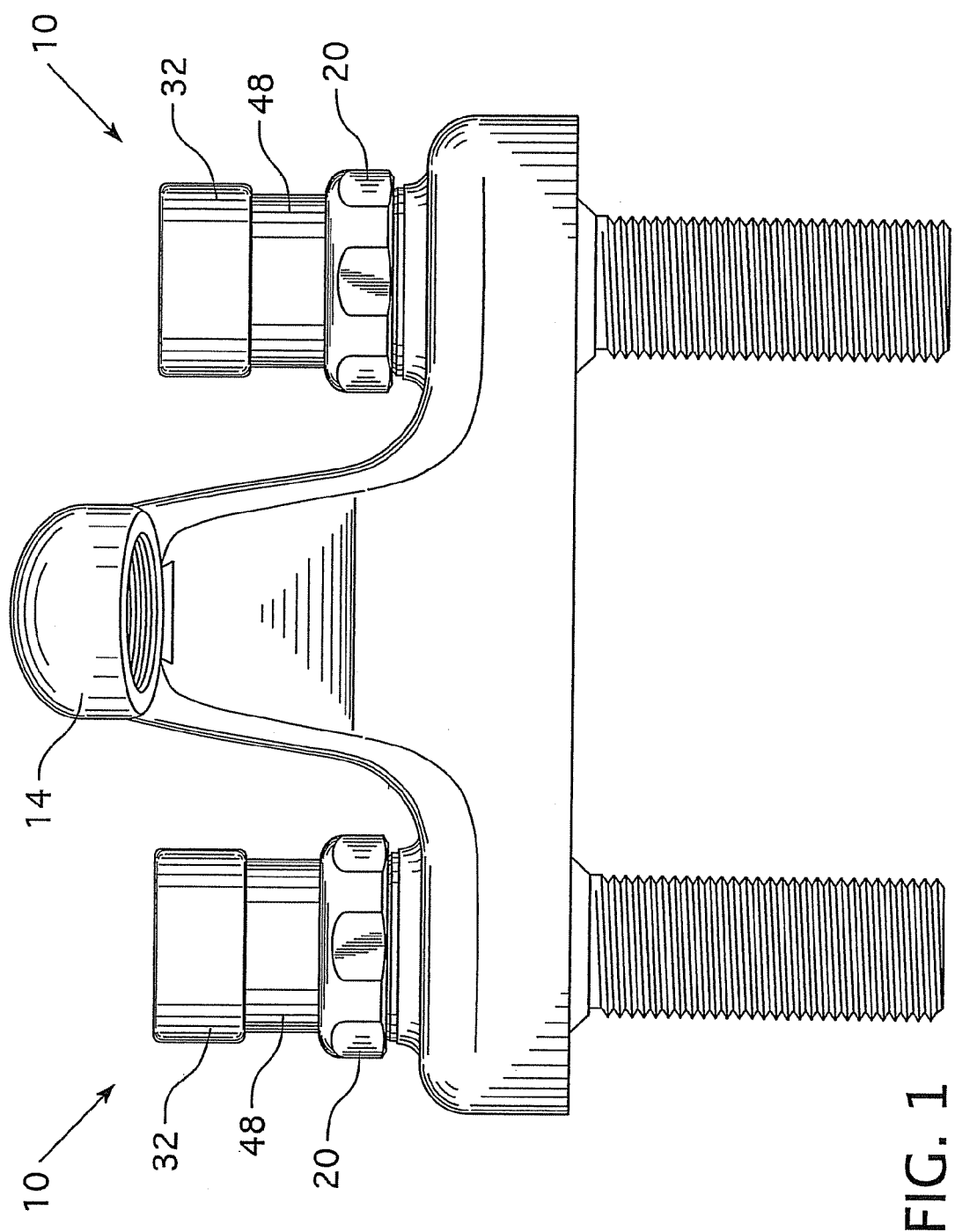
FIG. 1 shows a perspective view of a pair of the institutional handle assemblies of the invention mounted on a sink.
Figure 2:
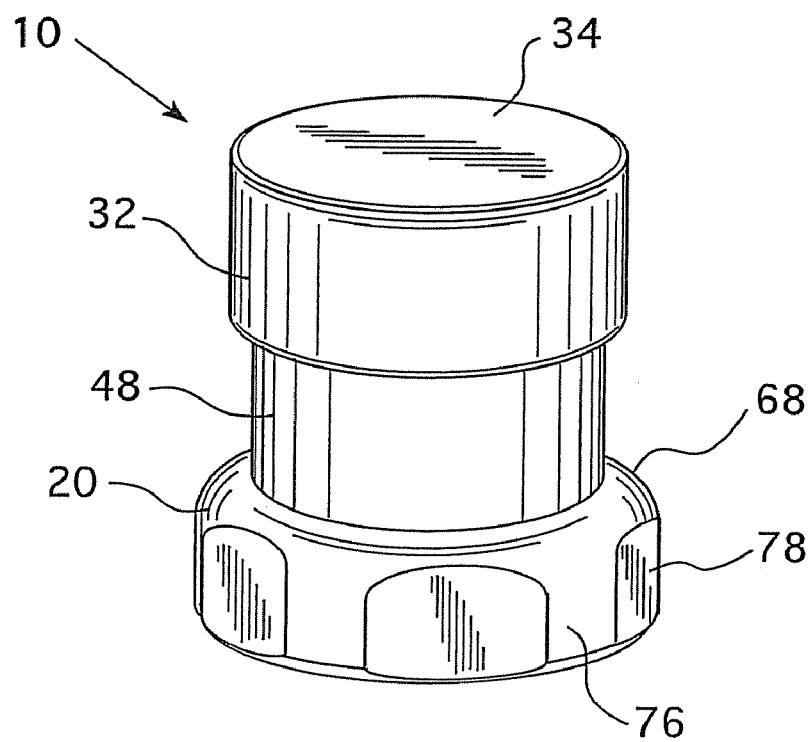
FIG. 2 shows a perspective view of the institutional handle assemblies of the invention.
Figure 3:
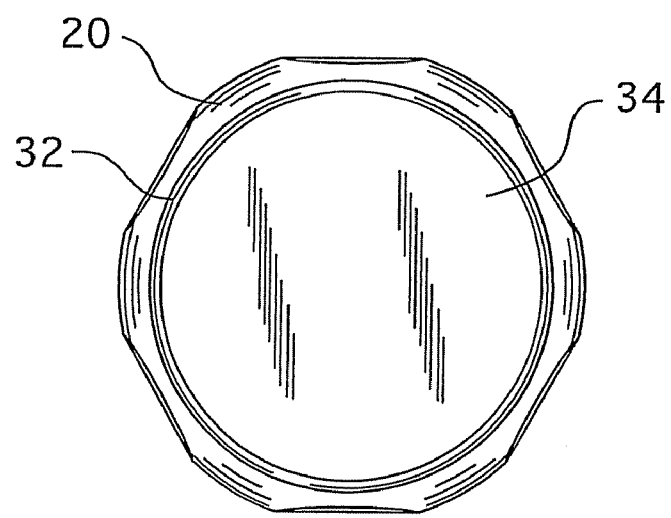
FIG. 3 shows a top view of the handle assembly of FIG. 2.
Figure 4:
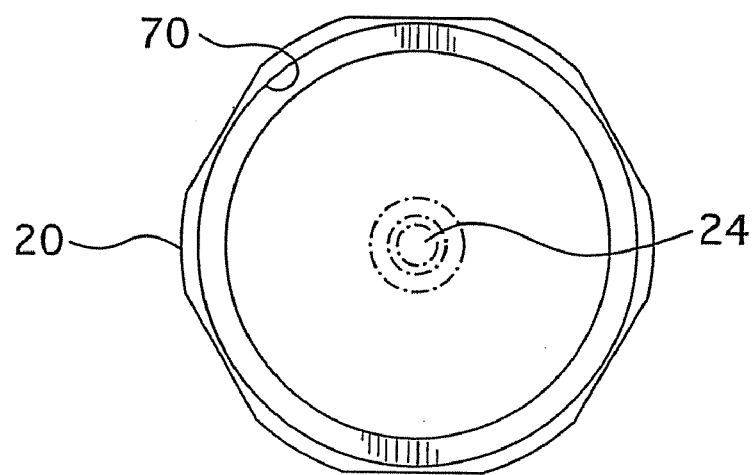
FIG. 4 shows a bottom view of the handle assembly of FIG. 2.
Figure 5:
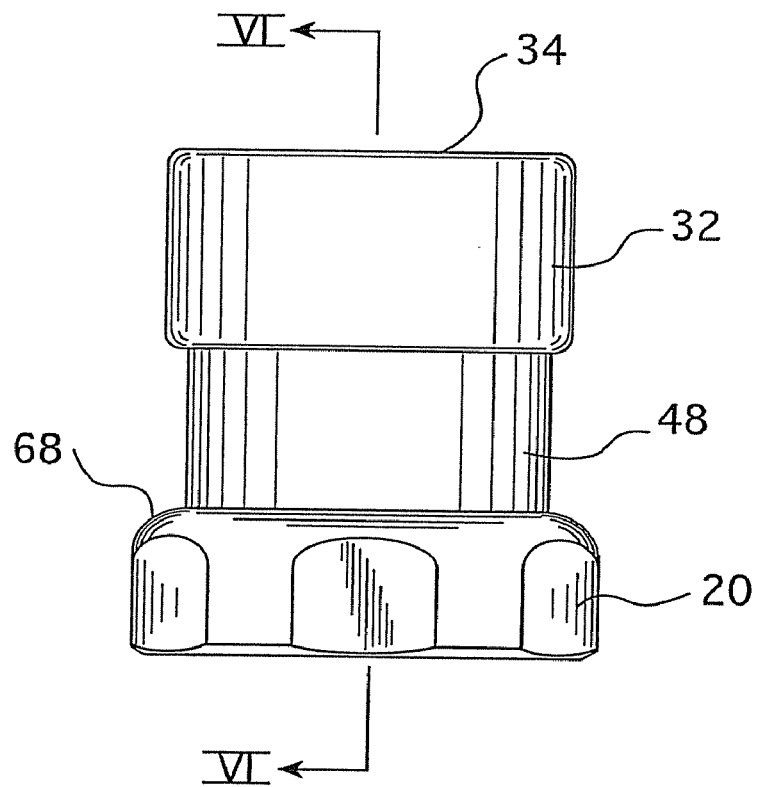
FIG. 5 shows a side elevational view of the handle assembly of FIG. 2.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific components illustrated in the attached drawings, and described in the following specification, are simply exemplary embodiments of the invention. Hence, specific dimensions and other physical characteristics related to the embodiments disclosed herein are not to be considered as limiting.

Reference is now made to FIG. 1 which shows a pair of institutional metered handle assemblies of the present invention, generally indicated as 10, mounted on a sink, not shown, for controlling the amount of water exiting a faucet 14.

Figure 6:
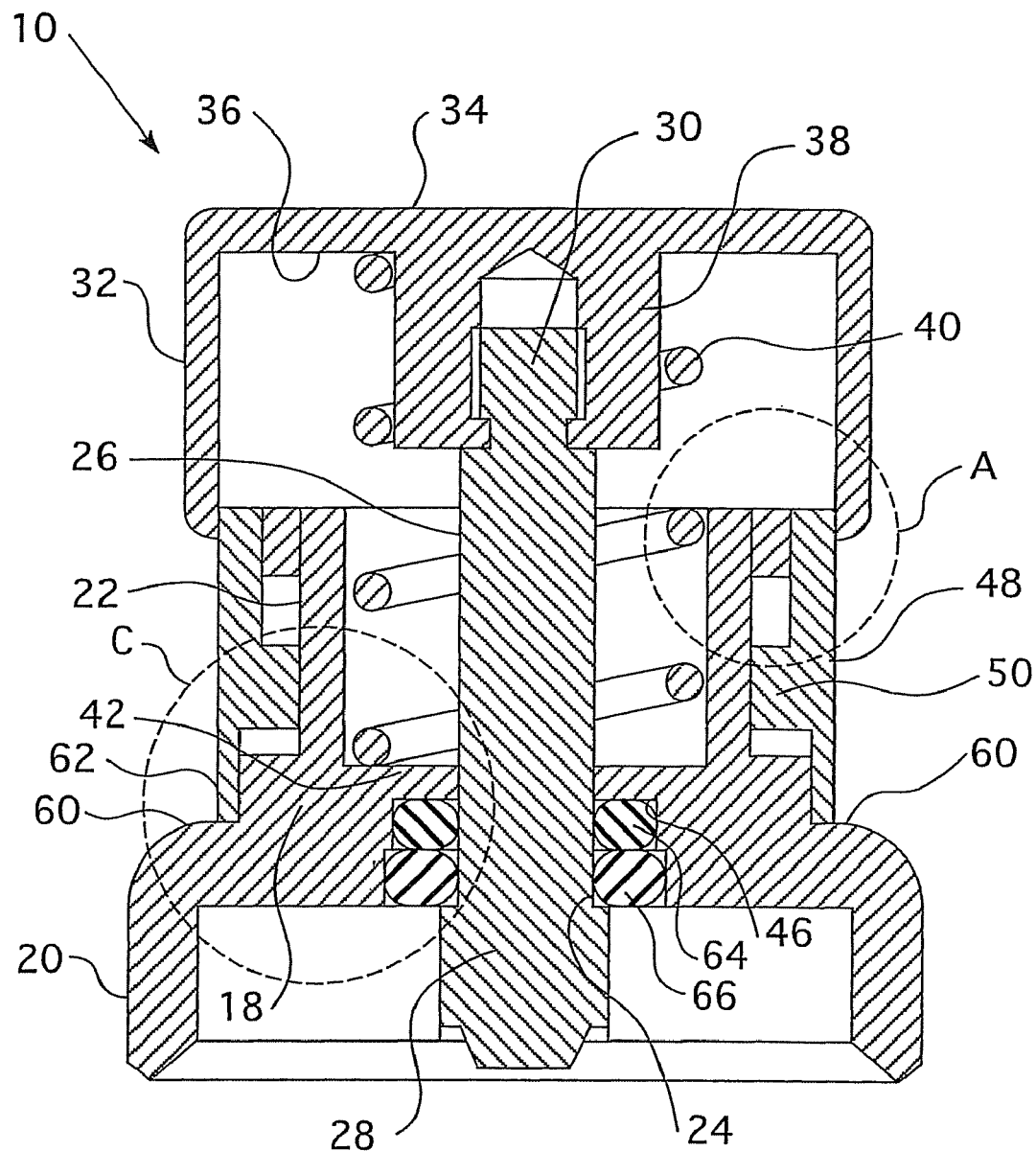
FIG. 6 shows a cross-sectional view taken along the line VI-VI of FIG. 5.
Figure 7:
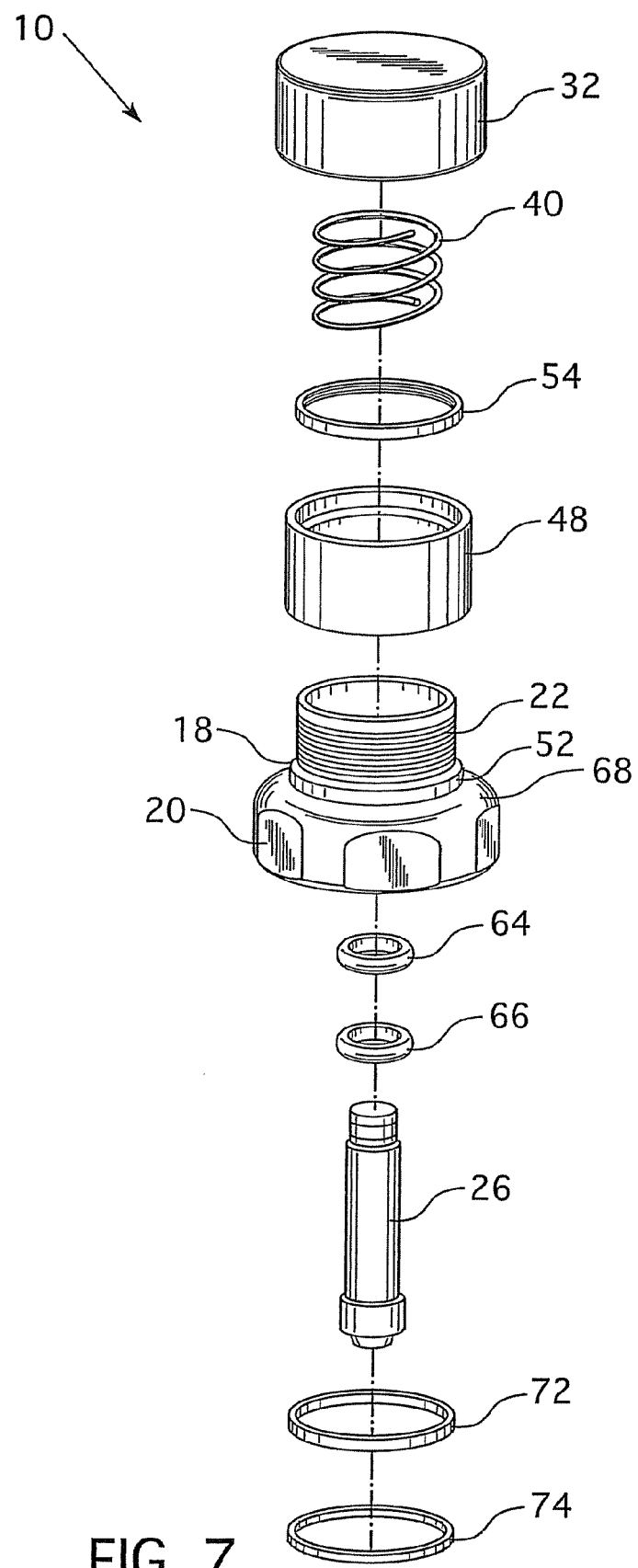
FIG. 7 shows an expanded view of the individual components of the handle assembly of FIG. 2.

As shown in FIGS. 2-7, particularly in FIGS. 6 and 7, each of the metered handle assemblies 10 includes a push button body 18 including a base 20 adapted for attachment to a Sink and a sidewall 22 extending in an upward direction with respect to the base 20. The base 20 includes an aperture 24 extending therethrough. As shown in FIGS. 6 and 7, a stem 26 is provided having a first portion 28 and a second portion 30. The first portion 28 of the stem 26 extends through the aperture 24 in the base 20 of the body 18. An O-ring 64 and a plastic retaining ring 66 may be positioned within the aperture 24 of the base 20 for sealing the base 20 with the stem 26.

A push button handle 32 is attached to the second portion 30 of the stem 26. This push button handle 32 has an outer surface 34 and inner surface 36. The inner surface 36 of the push button handle 32 is attached to the second portion 30 of the stem 26. According to one example, this attachment can be achieved via a fitting 38 extending from the inner surface 36 of the push button handle 32 such that the second portion 30 of the stem 26 fits up into this fitting 38. In order to increase the vandal resistance of the handle assembly 10, an adhesive material may be used for attaching this fitting 38 to the second portion 30 of the stem 26. Any other known attachment devices and/or adhesives may be used for attaching the push button handle 32 to the stem 26.

A spring 40 is associated with the body 18 and the push button handle 32 for metering an amount of water emitting from the faucet 14. Preferably the base 20 of the body 18 includes an inwardly extending shoulder 42 wherein the shoulder has a top surface 44 and a bottom surface 46. The spring 40 may be caged between this top surface 44 of the shoulder 42 and the inner surface of the handle 32 and encircles the stem 20.

Figure 6A:
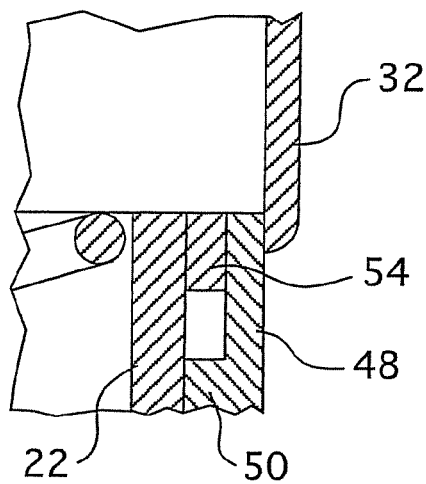
FIG. 6A shows an expanded detail of portion "A" of FIG. 6.
Figure 6B:
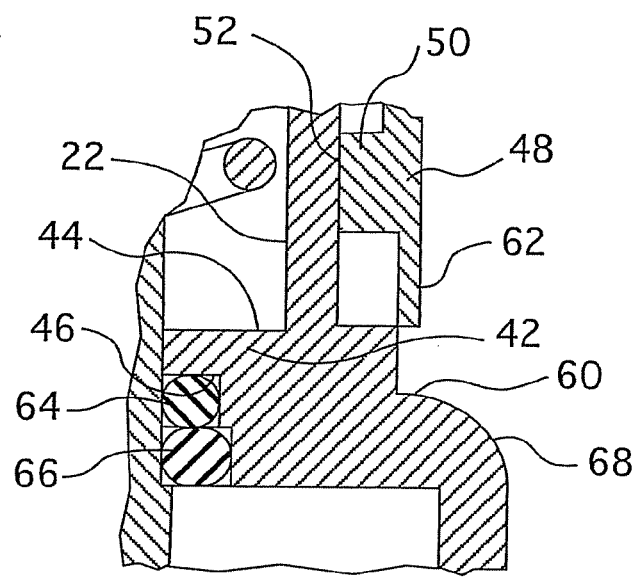
FIG. 6B shows an expanded detail of portion "C" of FIG. 6 with the adjustable sleeve in an upward position.
Figure 6C:
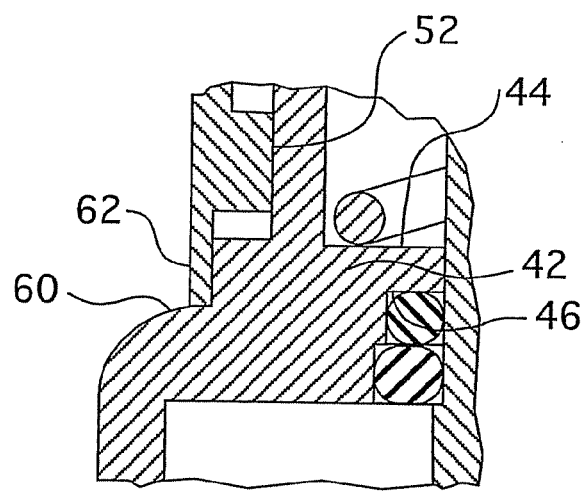
FIG. 6C shows an expanded detail of portion "C" of FIG. 6 with the adjustable sleeve in a downward position depicting the range of adjustability of the handle assembly.

A sleeve 48 is positioned between the body 18 and the push button handle 32. As shown in FIGS. 6A-6C, this sleeve 48 includes an inwardly extending connecting portion 50 for cooperating with the sidewall 22 of the body 18 for adjusting the distance between the push button handle 32 and the body 18 resulting in an adjustment of the shut-off time of the metered handle assembly 10. Threads 52 are provided on an outer surface of the sidewall 22 and on the connecting portion 50 such that the connecting portion 50 is threadedly connected and movable along the sidewall 22 of the body 18 such that the connecting portion 50 is adapted for movement along a predetermined distance or height of the sidewall 22. FIG. 6B shows the connecting portion 50 of sleeve 48 in an "upper" position with respect to the sidewall 22, which results in a maximum stroke distance of the push button handle 32 with respect to the body 18 resulting in an increased shut-off time of the faucet. In the FIG. 6C arrangement, the connection portion 50 of sleeve 48 is in a "lower" position with respect to sidewall 22, to form a minimum stroke distance of the push button handle 32 with respect to body 18, decreasing the shut off time of the faucet.

An index retaining ring 54 is positioned between the sleeve 48 and the sidewall 22 of the body 18. Preferably this retaining ring 54 is formed from a non-compressible material, such as brass and is located between an upper position 56 of the sidewall 22 and an upper portion 58 of the sleeve 48.

The base 20 of the body 18 includes an outwardly extending shoulder 60. This outwardly extending shoulder 60 is adapted for cooperating with a bottom portion 62 of the sleeve 48.

The base 20 of the body 18 includes an exposed shoulder 68 for attachment to the sink, not shown. The exposed shoulder 68 includes an inner rim 70 having a seal 72 and an O-ring 74 positioned within the rim 70 to seal the handle assembly 10 to the sink. The exposed shoulder 68 preferably has a rounded outer surface or circumference. An alternative design can include rounded portions 76 spaced apart by flat sections 78. Conventional handle assemblies typically use hex-nut designs for the exposed shoulder portion 68 which are complementary to commonly used tools. This hex-nut design allowed for easier removal and/or replacement of the handle assembly. However, in locations where vandalism is especially prevalent, such as correctional institutions where these handle assemblies 10 are often destroyed and/or disassembled and the components thereof are reconstructed into weapons, it is desirable to design a handle assembly that is vandal resistant. The particularly-designed exposed shoulder portion 68, as discussed above, requires the use of a special wrap-around wrench in order to disassemble the handle assembly 10 from the sink. Additionally, as also discussed above, adhesive attachment of the components, such as the push button handle 32 to the stem 26 makes it difficult for the handle assembly 10 to be deconstructed and/or destroyed.

Typically, handle assemblies 10 are labeled hot or cold indicating the temperature of the water to be emitted by actuation of this handle by providing an etched symbol or label across the top outer surface 34 of the push button handle. These symbols or labels often become scratched, worn or tampered with so that it is difficult to determine the original symbol. The sleeve 48 of the present invention may be color coded to depict water temperature. For example, a blue sleeve would indicate a cold water handle, a red sleeve would indicate a hot water handle, and a black sleeve, or any other color sleeve, would indicate a tempered handle.

As discussed above, the timing of the faucet 14 is adjusted simply by rotating the colored sleeve 48. Rotation of the sleeve 48 in a first direction permits the spring 40 to extend a maximum first stroke distance and rotation of the sleeve 48 in a second direction reduces the distance between the push button handle 32 and the base 20 of the body 18 and permits the spring 40 to travel a minimum second stroke distance. The first stroke distance is greater than the second stroke distance. The sleeve 48 is adapted to contact a conventional timing cartridge. The amount of water passing through the faucet 14 for each depression of the handle 32 is limited by the stroke distance of the spring 40 and stem 26. It then follows that the handle 32, the spring 40, and the stem 26 traveling a first stroke distance will permit more water to pass through the faucet 14 than the handle 32, spring 40, and stem 26 traveling a second stroke distance.

A method of adjusting the timing of a metered handle assembly 10 includes providing a body 18 including a base 20 adapted for attachment to a sink, not shown, and a sidewall 22 extending in an upward direction with respect to the base 20. The base 20 includes an aperture 24 extending therethrough. The method further includes providing a stem 26 having a first portion 28 and a second portion 30 and extending this first portion 28 of the stem 26 through the aperture 24 in the base 20 of the body, providing a push button handle 32 having an outer surface 34 and an inner surface 36, attaching the inner surface 36 of the push button handle 32 to the second portion 30 of the stem, associating a spring 40 with the body 18 and the push button handle 32. Preferably the spring 40 is caged between the inwardly extending shoulder 42 of the base 20 of the body 18 and the inner surface 36 of the push button handle 32. This spring 40 assists with metering an amount of water emitting from the faucet 14. The method also includes positioning a sleeve 48 between the body 18 and the push button handle 32 wherein this sleeve 48 includes an inwardly extending connecting portion 50 adapted for moving along a predetermined height of the sidewall 22 of the body 18. The timing of the metered handle assembly 10 is achieved by adjusting the sleeve 48, with respect to the height of the sidewall 22, i.e., by rotating along threads 52, which adjusts a distance between the push button handle 32 and the base 20 of the body 18 to adjust a shut-off time of the metered handle assembly 10. The adjustment of the metered handle assembly 10 is achieved by movement of the sleeve 48 along the sidewall 22 to determine a maximum stroke distance and a minimum stroke distance of the push button handle 32, stem 26, and spring 40 with respect to the body 18. Such adjustment of the shut-off time of the metered handle assembly 10 controls a predetermined amount of water to be released from the faucet 14. This adjustment is readily achieved without the time consuming task of disassembling of the handle assembly and adjustment of the internal components.

Although the invention has been described in detail for the purpose of illustration based on what is currently considered to be the most practical and preferred embodiments, it is to be understood that such detail is solely for that purpose and that the invention is not limited to the disclosed embodiments, but on the contrary, is intended to cover modifications and equivalent arrangements that are within the spirit and scope of the invention. For example, it is to be understood that the present invention contemplates that, to the extent possible, one or more features of any embodiment can be combined with one or more features of any other embodiment.

The invention claimed is:

1. An adjustable metered handle assembly for a faucet, said handle assembly comprising:
    a body including a base adapted for attachment to a sink and a sidewall extending in an upward direction with respect to said base, said base including an aperture extending therethrough;
    a stem having a first portion and a second portion, said first portion extending through the aperture in said base of the body;
    a push button handle having an outer and inner surface, said inner surface attached to said second portion of said stem;
    a spring associated with the body and the push button handle for metering an amount of water emitting from the faucet;
    a sleeve positioned between the body and the push button handle, said sleeve including an inwardly extending connecting portion for cooperating with the sidewall of the body for adjusting the distance between the push button handle and the body resulting in an adjustment of the shut-off time of the metered handle assembly; and
    a fitting extending from said inner surface of said push button handle for joining said second portion of said stem to said push button handle and an adhesive material for attaching said fitting to said second portion of said stem.

2. An adjustable metered handle assembly for a faucet, said handle assembly comprising:
    a body including a base adapted for attachment to a sink and a sidewall extending in an upward direction with respect to said base, said base including an aperture extending therethrough;
    a stem having a first portion and a second portion, said first portion extending through the aperture in said base of the body;
    a push button handle having an outer and inner surface, said inner surface attached to said second portion of said stem;
    a spring associated with the body and the push button handle for metering an amount of water emitting from the faucet; and
    a sleeve positioned between the body and the push button handle, said sleeve including an inwardly extending connecting portion for cooperating with the sidewall of the body for adjusting the distance between the push button handle and the body resulting in an adjustment of the shut-off time of the metered handle assembly and wherein said base of said body includes an inwardly extending shoulder, said shoulder having a top surface and a bottom surface.

3. The handle assembly of claim 2 wherein said spring is caged between said top surface of said shoulder and said inner surface of said handle.

4. An adjustable metered handle assembly for a faucet, said handle assembly comprising:
    a body including a base adapted for attachment to a sink and a sidewall extending in an upward direction with respect to said base, said base including an aperture extending therethrough;
    a stem having a first portion and a second portion, said first portion extending through the aperture in said base of the body;
    a push button handle having an outer and inner surface, said inner surface attached to said second portion of said stem;
    a spring associated with the body and the push button handle for metering an amount of water emitting from the faucet; and
    a sleeve positioned between the body and the push button handle, said sleeve including an inwardly extending connecting portion for cooperating with the sidewall of the body for adjusting the distance between the push button handle and the body resulting in an adjustment of the shut-off time of the metered handle assembly and wherein said base includes an exposed shoulder for attachment to the sink.

5. The handle assembly of claim 4 wherein said exposed shoulder has a rounded outer surface.

6. The handle assembly of claim 4 wherein said bottom exposed shoulder includes an inner rim and a seal and an O-ring positioned within said rim to seal said assembly to said sink.

7. A vandal resistant metered handle assembly for a faucet, said handle assembly comprising:
    a body including a base adapted for attachment to a sink and a sidewall extending in an upward direction with respect to said base, said base including an aperture extending therethrough;
    a stem having a first portion and a second portion, said first portion extending through the aperture in said base of the body;
    a push button handle having an outer and inner surface, said inner surface attached to said second portion of said stem;
    a spring associated with the body and the push button handle for metering an amount of water emitting from the faucet;

a sleeve positioned between the body and the push button handle, said sleeve including an inwardly extending connecting portion for cooperating with the sidewall of the body; and an exposed shoulder provided on said base for attachment of said handle assembly to the sink wherein said exposed shoulder has a vandal resistant rounded outer surface.

8. The handle assembly of claim 7 wherein said exposed shoulder is rounded about substantially the entire circumference of said outer surface.

9. The handle assembly of claim 7 wherein said exposed shoulder includes rounded portions spaced apart by flat sections.

10. The handle assembly of claim 7 including a fitting extending from said inner surface of said push button handle and an adhesive material included in said fitting for adhesively joining said second portion of said stem to said push button handle.

11. The handle assembly of claim 7 wherein said connecting portion is threadedly connected to the sidewall of the body for adjusting the height between the push button handle and the body between a maximum first stroke distance and a minimum second stroke distance to adjust the shut-off time of the handle assembly.

* * * * *